United States Patent [19]

Niedrach et al.

[11] 3,923,627
[45] Dec. 2, 1975

[54] MINIATURE PROBE CONTAINING MULTIFUNCTIONAL ELECTROCHEMICAL SENSING ELECTRODES

[75] Inventors: Leonard W. Niedrach; William H. Stoddard, Jr., both of Schenectady, N.Y.

[73] Assignee: General Electric Company, Schenectady, N.Y.

[22] Filed: Nov. 1, 1974

[21] Appl. No.: 519,797

[52] U.S. Cl. ......... 204/195 M; 128/2 E; 204/195 R
[51] Int. Cl.² ................. G01N 27/30; G01N 27/46
[58] Field of Search........ 204/195 R, 195 P, 195 M, 204/195 L, 1 T; 128/2 E, 2.1 E; 324/29

[56] References Cited
UNITED STATES PATENTS

| | | | |
|---|---|---|---|
| 3,705,088 | 12/1972 | Niedrach et al. | 204/195 P |
| 3,709,810 | 1/1973 | Grubb et al. | 204/195 R |
| 3,709,812 | 1/1973 | Niedrach et al. | 204/195 P |
| 3,719,576 | 3/1973 | Macur | 204/195 P |
| 3,730,868 | 5/1973 | Niedrach | 204/195 P |
| 3,794,575 | 2/1974 | Niedrach et al. | 204/195 P |
| 3,856,636 | 12/1974 | Grubb | 204/195 P |

*Primary Examiner*—G. L. Kaplan
*Attorney, Agent, or Firm*—Charles T. Watts; Joseph T. Cohen; Jerome C. Squillaro

[57] ABSTRACT

A miniature probe contains multifunctional electrochemical electrodes which measure specific ion activities. One of these electrodes is a specific ion electrode while the other electrode is a different specific ion electrode. Each of the electrodes is coupled with the same separate reference electrode or the reference electrode can surround the probe thereby providing a first specific ion sensor and a second specific ion sensor.

12 Claims, 4 Drawing Figures

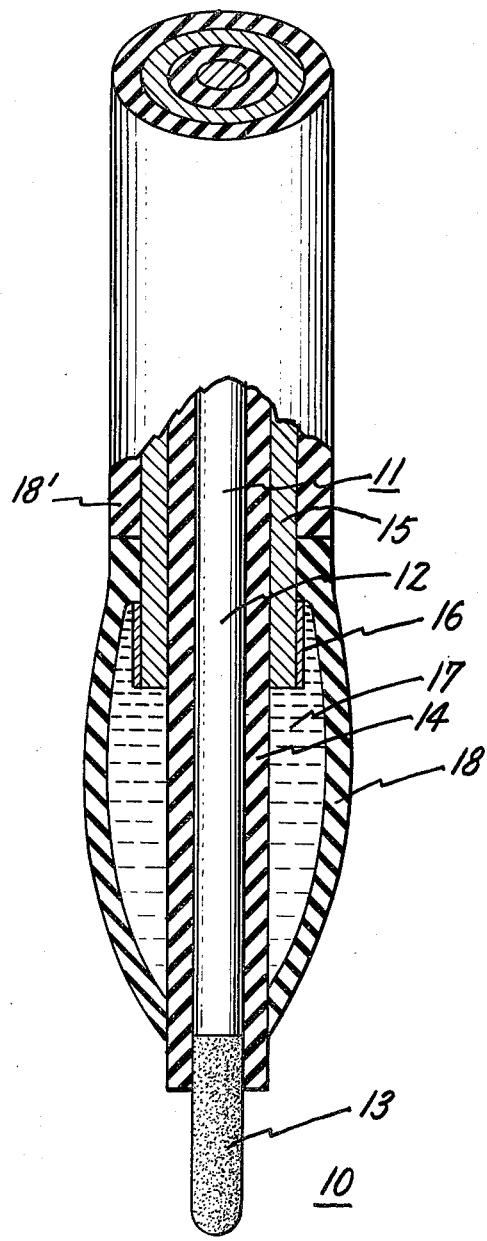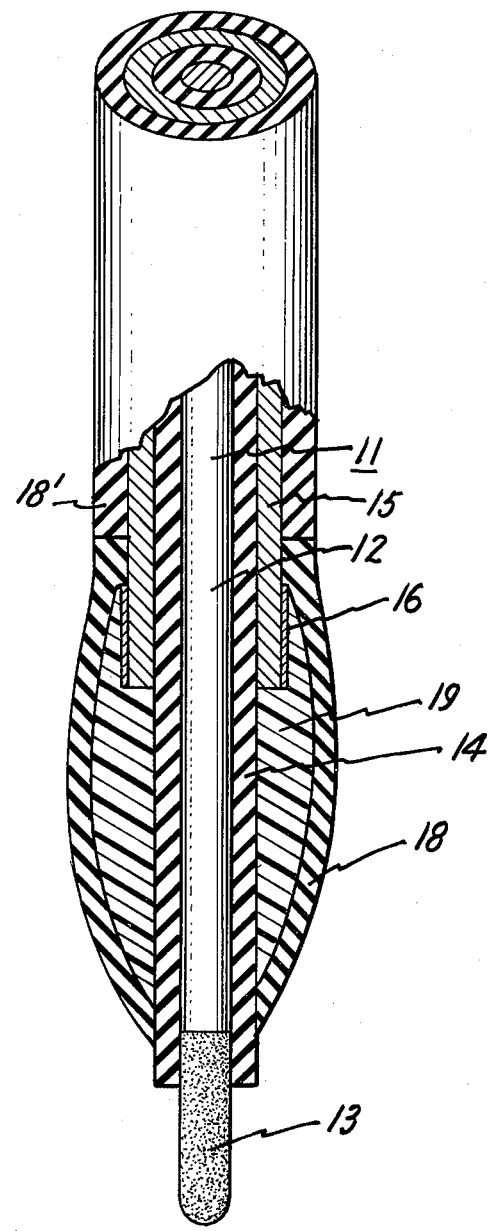

MINIATURE PROBE CONTAINING MULTIFUNCTIONAL ELECTROCHEMICAL SENSING ELECTRODES

This invention relates to a miniature probe containing multifunctional electrochemical sensing electrodes, and more particularly, to such a miniature probe containing a first specific ion electrode, and a second different specific ion electrode.

Cross references are made to the following patent applications: Ser. No. 519,273, filed concurrently herewith which application is entitled "Miniature Probe Having Multifunctional Electrodes for Sensing Ions and Gases" in the name of Robert A. Macur; Ser. No. 519,795, filed concurrently herewith which application is entitled "Miniature Probe Containing Multifunctional Electrochemical Sensing Electrodes" in the names of Leonard W. Niedrach and William H. Stoddard, Jr.; Ser. No. 519,794, filed concurrently herewith which application is entitled "Miniature Probe Containing Multifunctional Electrochemical Sensing Electrodes" in the names of Leonard W. Niedrach and William H. Stoddard, Jr.; Ser. No. 519,796, filed concurrently herewith which application is entitled "Miniature Probe Containing Multifunctional Electrochemical Electrodes" in the name of John F. Brown, Jr.; and Ser. no. 519,798, filed concurrently herewith which application is entitled "Miniature Multifunctional Electrochemical Sensor For Simultaneous Carbon Dioxide and pH Measurements" in the names of Oliver H. LeBlanc, Jr., Willard T. Grubb, and Robert A. Macur.

The above five cross-referenced patent applications are assigned to the same assignee as the present application.

Sensors are employed to determine the content of a specific substance in a fluid or atmosphere. For example, a sensor might be employed to determine the content of carbon dioxide in a sample, or its content of hydrogen ions or other ions, such as potassium ions or chloride ions in solution.

Hydrogen ion and carbon dioxide sensors are known, respectively, in the prior art for measuring the hydrogen ion activity or pH of a sample, or for measuring the carbon dioxide content of a sample. Hydrogen ion-specific membranes and potassium ion-specific membranes are known also. A hydrogen ion or pH sensor is described and claimed in U.S. Pat. Nos. 3,671,414, 3,709,810 and 3,719,576. Carbon dioxide sensors are described in U.S. Pat. Nos. 3,673,069, 3,705,088, 3,709,812 and 3,719,576. Methods of manufacturing sensors by successive layers are described in U.S. Pat. No. 3,798,750. Hydrogen ion-specific membranes are described in U.S. Pat. No. 3,743,588 while potassium ion-specific membranes are described in U.S. Pat. No. 3,767,553. All of the above patents are assigned to the same assignee as the present application.

Our present invention is directed to an improved miniaturized multifunctional probe which is suitable for biomedical, environmental control and other applications which probe can be used for in vivo or in vitro analyses.

The primary objects of our invention are to provide a rugged, accurate and miniaturized multifunctional probe for specific ion measurements.

In accordance with one aspect of our invention, a miniature probe contains a first specific ion electrode and a second, different specific ion electrode.

These and various other objectives, features and advantages of the invention will be better understood from the following description taken in connection with the accompanying drawing in which:

FIG. 1 is a partial sectional view of a miniature probe containing a hydrogen ion electrode and a second, different cation electrode made in accordance with our invention;

FIG. 2 is a partial sectional view of a modified miniature probe;

Figure 3:
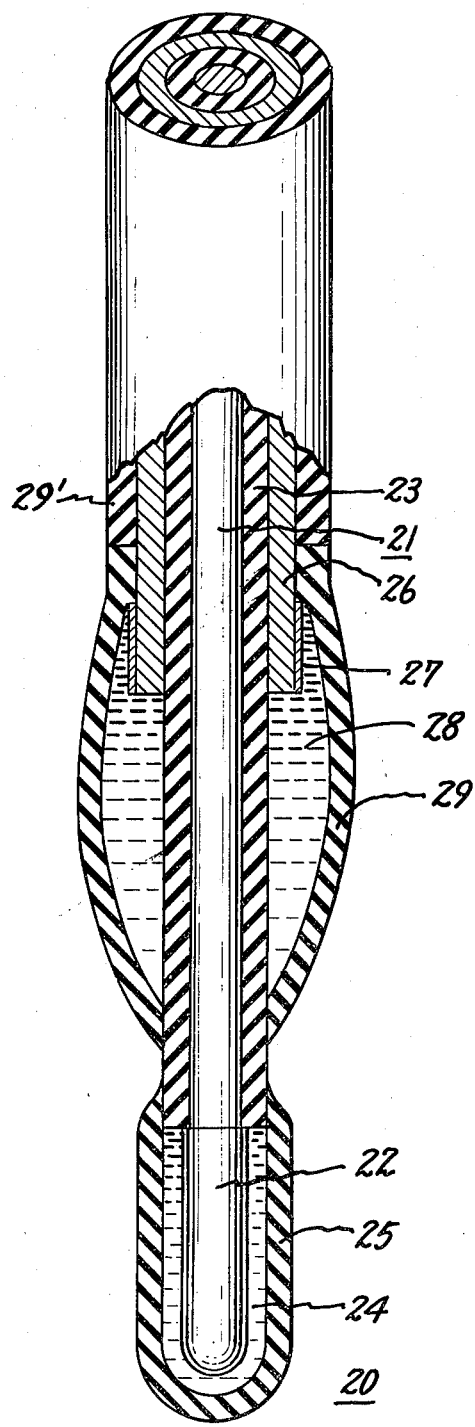
FIG. 3 is a partial sectional view of another modified miniature probe.

In FIG. 1 of the drawing, there is shown generally at 10 a partial sectional view of a miniature multifunctional probe containing a first specific ion electrode, a hydrogen ion electrode, and a second, different ion electrode, a potassium electrode, made in accordance with our invention. The hydrogen electrode is shown in the form of flexible elongated electrode lead 11 which has a base member and an exterior surface 12 of a metal selected from the class consisting of palladium and iridium on the base member. An electrochemically active region 13 adheres tightly to and is in electrical contact with at least a portion of the metal surfaced base member 12 of the electrode lead 11 thereby forming a hydrogen ion electrode. Electrochemically active region 13 is selected from the class consisting of the respective oxide of the exterior surface metal. Other coatings showing electrochemical response to pH changes could also be used. A layer of electrical insulation 14 covers the remainder of metal surfaced base member 12 of electrode lead 11 and overlaps slightly active region 13 thereby providing a hydrogen ion electrode.

A potassium electrode is shown in the form of a second lead 15 which surrounds at least partially and is spaced from the metal surfaced base member of the electrode lead 11 by insulation 14. Second lead 15 contains a region 16 of silver and a silver halide other than fluoride. An electrolyte 17, which is aqueous and immobilized and contains $K^+$ ion, halide ion corresponding to that of the silver halide and contains buffer ions contacts region 16. An outer sheath 18 of potassium ion permeable membrane encapsulates at least region 16 and electrolyte 17. Outer sheath 18 forms a tight bond with insulation 14 thereby leaving active region 13 exposed outside sheath 18. An inert electrical insulation 18' which is impermeable to ions is employed over lead 15.

In FIG. 2, there is shown a partial sectional view of a modified miniature multifunctional probe containing a first specific ion electrode, a hydrogen ion electrode, and a second different ion electrode, a potassium ion electrode. The hydrogen ion electrode is shown in the form of flexible, elongated electrode lead 11 which has a base member and an exterior surface 12 of palladium metal or iridium on the base member. An electrochemically active region 13 adheres tightly to and is in electrical contact with at least a portion of the metal surfaced base member 12 of the electrode lead 11 thereby forming a hydrogen ion electrode. Electrochemically active region 13 is of palladium oxide or iridium oxide. A layer of electrical insulation 14 covers the remainder of metal surfaced base member 12 of electrode lead 11 and overlaps slightly active region 13.

A potassium ion electrode is shown in the form of a second lead 15 which surrounds at least partially and is spaced from the metal surfaced base member of the electrode lead 11 by insulation 14. Second lead 15 contains a region 16' of silver. An electrolyte 19 of a cation exchange resin with mixed $Ag^+$–$K^+$ contacts regions 16'. An outer sheath 18 of potassium ion permeable membrane encapsulates region 16' and electrolyte 19. An inert electrical insulation 18' impermeable to ions is employed over lead 15. Outer sheath 18 forms a tight bond with insulations 14 and 18' thereby leaving active region 13 exposed outside sheath 18.

In FIG. 3, there is shown a partial sectional view of a modified miniature multifunctional probe 20 containing a first specific ion electrode, potassium ion electrode, and a second, different ion electrode, a hydrogen ion electrode. The potassium ion electrode is shown in the form of flexible, elongated metallic base member 21 with a region 22 at one end thereof consisting of silver and a silver halide other than fluoride. A layer of electrical insulation 23 covers the remainder of metallic base member 21. An electrolyte 24, preferably aqueous and immobilized and containing $K^+$ ion, halide ion corresponding to that of the silver halide and containing buffer ions adheres to region 22 of base member 21. An outer sheath 25 of potassium ion-permeable membrane encapsulates electrolyte 24 and preferably overlaps insulation 23.

A hydrogen ion electrode is shown in the form of a lead 26 which surrounds at least partially and is spaced from metallic base member 21 by insulation 23. Lead 26 contains a region 27 of silver and a silver halide. An electrolyte 28, which is aqueous and immobilized and contains an alkali halide corresponding to the halide in the silver halide and a buffer contacts region 27. An outer sheath 29 of hydrogen ion-permeable membrane encapsulates at least region 27 and electrolyte 28. An inert electrical insulation 29' impermeable to ions is employed over lead 26. Outer sheath 29 forms a tight bond with insulations 23 and 29'.

Figure 4:
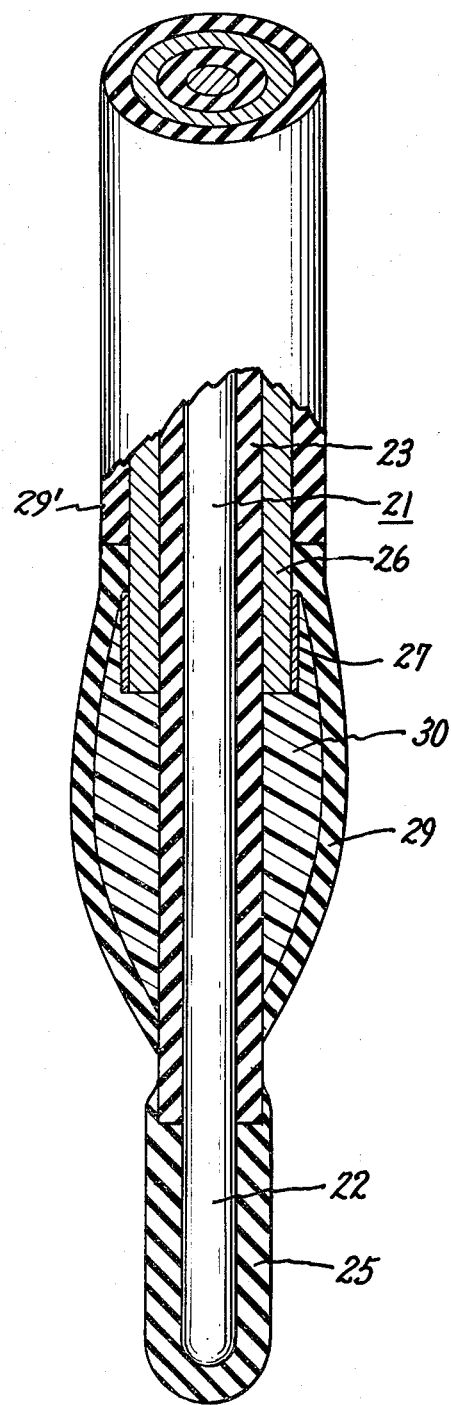
FIG. 4 is a partial sectional view of a further modified miniature probe.

In FIG. 4, there is shown a partial sectional view of a further modified miniature multifunctional probe containing a first specific ion electrode, a potassium ion electrode and a second, different ion electrode, a hydrogen ion electrode. The hydrogen ion electrode is shown in the form of flexible, elongated metallic base member 21 with an oxidized region 22 at one end thereof. A layer of electrical insulation 23 covers the remainder of metallic base member 21. An outer sheath 25 of potassium ionpermeable membrane adheres tightly to oxidized region 22 and preferably overlaps insulation 23.

A potassium ion electrode is shown in the form of a lead 26 which surrounds at least partially and is spaced from metallic base member 21 by insulation 23. Lead 26 contains a region 27 of silver. A cation exchange resin electrolyte 30 in mixed $K^+$–$Ag^+$ form contacts region 27'. An outer sheath 29 of potassium ion-permeable membrane encapsulates at least region 27' and electrolyte 30. An inert electrical insulation 29' is employed over lead 26. Outer sheath 29 forms a tight bond with insulations 23 and 29'.

We found that we could form the above improved probe by a method of applying successive elements or layers by immersing or dipping the initial metal surfaced member in various organic solutions after which each solution solvent was evaporated. The application of the successive layers is preferably accomplished by immersion steps but other suitable means include coating, spraying, brushing, etc. The use of immersion steps is described and claimed in the above-referenced U.S. Pat. No. 3,798,750.

The miniature probe of our invention can be formed as shown in FIGS. 1 and 2 by employing for the initial support wire or electrode lead palladium or iridium metal. In the event that a metal other than palladium or iridium is employed, a layer of palladium or iridium must be deposited on at least one portion thereof for application thereto of a palladium oxide or iridium oxide region. Such aa region is provided on the metal surfaced base member as described in the above U.S. Pat. Nos. 3,705,088 and 3,719,576. these U.S. Pat. Nos. 3,705,088 and 3,719,576 and the subject matter therein are hereby incorporated by reference.

In FIGS. 1 and 2, various electrical insulating materials are usable and many of such materials can be applied by coating steps. Preferred materials include epoxy resins, Alkanex polyester resin lacquer, polytetrafluoroethylene, silicone rubbers, and polypropylene oxides. Alkanex polyester resin lacquer is preferred which provides the desired electrical insulation and which can be applied by coating or dipping. The Alkanex polyester resin lacquer can be cross-linked by heating to insolubilize and thereby facilitate the application of successive layers.

Our miniature probe can be formed generally by applying successive elements from various organic solutions after which each solution solvent is evaporated. The application of the successive layers is preferably accomplished by a series of immersion or application coating steps.

With reference to FIGS. 1 and 2 of the drawing, a miniature probe is formed in accordance with our invention by employing a 20-mil palladium wire 11 as the base or electrode lead upon which the successive elements are applied. An electrochemically active region 13 is formed in electrical contact with one end of wire 11 by roughening the one end of the electrode lead by sand blasting and then coating with palladium oxide in accordance with the above U.S. Pat. Nos. 3,705,088 and 3,719,576. Wire 11 has its central portion coated with a solution of Alkanex polyester resin lacquer to provide a layer of electrical insulation 14 on wire 11. It will be appreciated, of course, that a tube of insulation could be applied over the central portion of the current collector by slipping the tube over the collector. The opposite end of wire 11 (not shown) is left exposed for subsequently applying an electrical lead thereto. Active region 13 on wire 11 provides the hydrogen ion or pH electrode. In operation, this electrode is connected electrically to a separate conventional reference electrode, such as a silver—silver chloride reference electrode, to provide a hydrogen ion activity reading or pH measurement.

A potassium ion electrode is formed as part of the miniature probe by providing a second metallic lead 15 which surrounds at least partially and is spaced from the metal surfaced base member of the electrode lead 11 by insulation 14. Second lead 15 contains a region 16 of silver and a silver halide. An electrolyte 17, which is aqueous and immobilized, contacts region 16. Such an immobilized electrolyte can be in the form of an aqueous electrolyte by immobilizing the solution with a gelling agent such as Methocel gelling agent which is methylcellulose sold by Dow Chemical Company, Midland, Mich. A suitable electrolyte is provided by 0.15

M sodium chloride and a phosphate buffer containing 3.0% of Methocel gelling agent. An outer sheath 18 of potassium ion permeable membrane encapsulates at least region 16 and electrolyte 17. Outer sheath 18 is a potassium ion-specific membrane which includes a hydrophobic elastomeric polymer with a dielectric constant of from 4 to 13, and a potassium ion carrier. The membrane is made in accordance with above-identified U.S. Pat. No. 3,768,533, which patent and its subject matter is incorporated by reference into this application. An inert electrical insulation 18' that is impermeable to ions such as a silicon-polycarbonate block copolymer as described in U.S. Pat. No. 3,189,622 is employed over the lead 15. Outer sheath 18 forms a tight bond with insulations 14 and 18' thereby leaving active region 13 exposed outside sheath 18. If desired, different electrical insulation can be employed over lead 15.

In FIG. 2 an electrolyte 19 of cation exchange resin in the mixed $K^+$–$Ag^+$ form contacts region 16. An outer sheath 18 of potassium ion permeable diffusion barrier material encapsulates at least region 16 and electrolyte 19. Such a cation exchange resin such as a sulfonated polystyrene resin can be employed as the immobilized electrolyte and can be applied by coating. This resin coating is subsequently converted to the mixed $K^+$–$Ag^+$ form by equilibrating with the corresponding salts.

The miniature probe of our invention can be formed as in FIGS. 3 and 4 by employing for the potassium ion electrode an electronically conductive metallic base member 21 with a silver and silver halide surface 22 at one end thereof. The silver halide can be applied by chloriding a portion of the silver. The base member with surface is preferably in an elongated wire configuration. The tip of the wire is preferably rounded. A short length of the wire from the rounded end is left exposed. The remaining portion of the wire except for a short length at the opposite end is insulated with suitable electrical insulation 23, for example, Alkanex polyester resin lacquer.

In FIG. 3, the exposed region 22 is provided with an aqueous, immobilized electrolyte containing $K^+$ ion, halide ion corresponding to that of the silver halide and containing buffer by, for example, dipping the region in such an electrolyte. The immobilized electrolyte can be in the form of an aqueous electrolyte by immobilizing the solution with a gelling agent such as Methocel gelling agent which is methylcellulose sold by Dow Chemical Company, Midland, Mich. A suitable electrolyte is provided by 0.15 M sodium chloride and a phosphate buffer containing 3.0% of Methocel gelling agent.

An outer sheath 25 of potassium ion permeable membrane which can be applied by an immersion step, encapsulates region 22, electrolyte 24 and overlaps insulation 23 for a tight joint therewith. Outer sheath 25 which is similar to sheath 18 in FIG. 1 is a potassium ion-specific membrane which includes a hydrophobic elastomeric polymer with a dielectric constant of from 4 to 13, and a potassium ion carrier. The membrane is made in accordance with above-identified U.S. Pat. No. 3,767,533. The resulting structure is a potassium ion electrode.

In FIG. 4, the exposed, oxidized region 22 is contacted directly with an outer sheath 25 of hydrogen ion permeable membrane. The resulting structure is a hydrogen ion electrode.

A potassium ion electrode is formed in FIG. 3 as part of the miniature probe by providing a second metallic lead 26 which surrounds at least partially and is spaced from the base member 21 by insulation 23. Second lead 26 contains a region 27 of silver and a silver halide. An electrolyte 28, which is aqueous and immobilized and contains an alkali halide corresponding to the halide in the silver halide and a buffer contacts region 27. Such an immobilized electrolyte can be, as in FIG. 3, in the form of an aqueous electrolyte by immobilizing the solution with a gelling agent as previously described. An outer sheath 29 of hydrogen ion permeable membrane, which can be applied by an immersion or coating step, encapsulates region 27, electrolyte 28, and forms a tight joint with insulations 23 and 29'. The hydrogen ion permeable diffusion barrier material and its application are described in U.S. Pat. No. 3,743,588. This patent and its subject matter are hereby incorporated by reference. The resulting structure is a hydrogen ion electrode.

In FIG. 4, an electrolyte 30 of a cation exchange resin contacts region 16. Such a resin and its application is described above with reference to FIG. 2. The resulting structure is a hydrogen ion electrode.

Each of the resulting devices is a miniature probe containing multifunctional electrochemical sensing elements. The electrodes of each miniature probe are used with a conventional reference electrode for clinical and other analysis. A high impedance voltmeter is connected to the various electrodes of the probe and to a separate reference electrode.

Examples of miniature probes made in accordance with our invention are as follows:

EXAMPLE I

A miniature probe is formed in accordance with the above description and generally as shown in FIG. 1 of the drawing. The metal base member is in the form of a 20 mil palladium wire, one end of which is coated with palladium oxide. This is accomplished by dipping that end of the wire in 50 weight percent sodium hydroxide in water, heating the wire to 800° C. in air for 20 minutes, cooling the wire, rinsing it in distilled water, and drying in air before the next step of applying insulation partially thereto.

The remainder of the base member with the exception of about 1 cm. at the opposite end is coated with Alkanex polyester resin lacquer. This is accomplished by immersing a substantial portion of the base member in a solution of Alkanex polyester resin lacquer. The coated wire is heated at a temperature of 100° C. to evaporate the solvent and then to 200° C. to cross-link the coating. The coating step is repeated several times. The coating overlaps slightly the palladium oxide coating. This forms the hydrogen ionelectrode of the structure. A second lead of silver is applied as a tube over a portion of the insulation. A 0.5 cm. wide band at the end of the silver coating is chlorided anodically at a current of 0.5 ma. using a 0.1 NHCl bath with a platinum electrode serving as the counter electrode. The sequence of the chloriding steps is 2 minutes anodic, 2 minutes cathodic and 10 minutes anodic. After the silver and silver chloride band has been formed at the end of the silver coating, the middle portion of the structure excluding the palladium oxide region is applied thereon an aqueous immobilized electrolyte of 0.15M sodium chloride and a phosphate buffer containing 3.0% Methocel gelling agent. An outer sheath or layer of a potassium ion permeable membrane in the form of a hydrophobic elastomeric polymer with valinomycin is applied over the electrolyte excluding the palladium oxide region by contacting the structure wire with the solution of the polymer resin in chloroform. The chloroform is then removed by heating for 5 to 10 minutes in the nitrogen atmosphere at 50° C. The resulting polymer film is both a potassium ion permeable membrane. The second lead is coated with electrical insulation of a silicone-polycarbonate block copolymer as described in U.S. Pat. No. 3,189,622. The resulting structure is a miniature probe made in accordance with our invention.

EXAMPLE II

A miniature probe is formed in accordance with the above description, and as generally described in Example I and FIG. 2 of the drawing. After the structure is formed as in Example I following the application of the band of silver to the second lead, the middle portion of the structure excluding the palladium oxide region has applied thereon a cation exchange resin electrolyte in the mixed $K^+$–$Ag^+$ form. The electrolyte layer is applied by contacting the middle portion of the structure with a solution of the resin in a mixture of chloroform-methanol to contact the second lead and its associated silver portion. The structure is then heated in hydrogen at 50° C. for 10 minutes to eliminate any residual solvents. The electrolyte is converted to the mixed $K^+$–$Ag^+$ form by equilibrating with the corresponding salt. The structure is then rinsed briefly in water and dried for about 1 minute in flowing nitrogen gas at 50° C. The outer sheath of potassium ion permeable membrane is then applied as in Example I. Such application provides a tight joint with both electrical insulations. This portion of the structure provides the potassium ion electrode. The resulting device is a miniature probe made in accordance with our invention.

EXAMPLE III

A miniature probe is formed in accordance with the above description and generally shown in FIG. 3 of the drawing. The potassium ion electrode of the probe is in the form of a 20 mil palladium wire, one end of which is coated with a silver and silver chloride surface. The remainder of the base member with the exception of about 1 cm. at the opposite end is coated with Alkanex polyester resin lacquer. This is also accomplished as described above in Example I. The exposed coated region of the base member is provided with an aqueous immobilized electrolyte of 0.15M sodium chloride and a phosphate buffer containing 3.0 percent of Methocel jelling agent. The electrolyte is applied as described above in Example I. An outer sheath of potassium ion permeable membrane is applied by an immersion step thereby encapsulating the palladium oxide and overlapping the insulation on the base member. The outer sheath is in the form of hydrophobic elastomeric polymer with valinomycin.

The hydrogen ion electrode of the probe is formed by applying a metallic lead which surrounds partially and is spaced from the base member by the insulation surrounding the base member. This lead contains a region of silver and silver halide adjacent one end. An immobilized aqueous electrolyte of the type which surrounds the coated surface of the base member contacts the silver halide of the lead. The lead, the silver and silver halide region and the electrolyte are applied as above described in Example I. An outer sheath of hydrogen ion permeable membrane is applied by an immersion step thereby encapsulating the electrolyte and providing a tight joint with the insulations. The outer sheath is of the type described in above-identified U.S. Pat. No. 3,743,588. Specifically, the outer sheath is an ion-specific membrane comprising an outer hydrophobic elastomeric-polymer with a dielectric constant of from 4 to 13, and a $H^+$ ion carrier with a hydrophobic, lipophilic uncoupler of p-dodecyldenitrophenol. The resulting structure is a miniature probe.

EXAMPLE IV

A miniature probe is formed in accordance with the above description, and with FIG. 4 of the drawing. After one end of the base member is coated with palladium oxide and the middle portion is coated with lacquer as above described, an outer sheath of hydrogen ion permeable membrane is applied directly to the palladium oxide by an immersion step thereby encapsulating the palladium oxide and overlapping the insulation on the base member. The outer sheath is of the type described above in above-identified U.S. Pat. No. 3,743,588. After the region of silver has been applied to the second lead as above described, the middle portion of the structure has applied thereon a cation exchange resin electrolyte of sulfonated polystyrene resin in the same manner as in Example II. The electrolyte is applied and treated as in Example II. An outer sheath of potassium ion permeable diffusion barrier material of the same type as in Example III is applied in the same manner as in Example III. The resulting structure is a miniature probe.

While other modifications of the invention and variations thereof which may be embraced within the scope of the invention have not been described, the invention is intended to include such as may be embraced within the following claims.

What we claim as new and desire to secure by Letters Patent of the United States is:

1. A miniature probe containing a first specific ion electrode and a second specific ion electrode which comprises a flexible, elongated electrode lead, the electrode lead comprising a metallic base member, an electrochemically active region showing response to the first specific ion adhering tightly to and in electrical contact with one end portion of the metallic base member, and electrical insulation surrounding the metallic base member and a portion of the electrochemically active region and thereby forming a first specific ion electrode exposed at the end of the metallic base member beyond the electrical insulation; a second metallic electrode lead surrounding at least partially and spaced from the metallic base member of the first electrode lead by the electrical insulation thereon, a second electrochemically active region showing response to the second specific ion on the second electrode lead at one end thereof, electrical insulation surrounding the second metallic electrode lead, an electrolyte contacting the second electrochemically active region, and an outer sheath of a membrane permeable to the second specific ions encapsulating the second electrochemically active region and the electrolyte and forming a tight joint with the electrical insulations thereby forming a second specific ion electrode, but not encapsulating the exposed electrochemically active region of the first specific ion electrode.

2. A miniature probe as in claim 1, in which the outer sheath is a potassium ion diffusion barrier material.

3. A miniature probe as in claim 1, in which the electrolyte is an immobilized aqueous solution.

4. A miniature probe as in claim 1, in which the electrolyte is a cation exchange resin material.

5. A miniature probe containing a first specific ion electrode and a second specific ion electrode which comprises a flexible, elongated electrode lead, the electrode lead comprising an electronically conductive metallic base member, an electrochemically active region showing response to the first specific ion adhering tightly to and in electrical contact with one end portion of the metallic base member, electrical insulation surrounding the metallic base member, an electrolyte contacting the electrochemically active region, and an outer sheath of a membrane permeable to the first specific ions encapsulating the electrolyte and forming a tight joint with the electrical insulation thereby forming a first specific ion electrode; a second metallic electrode lead surrounding at least partially and spaced from the metallic base member of the first electrode lead by the electrical insulation thereon, a second electrochemically active region showing response to the second specific ions on the second electrode lead at one end thereof, electrical insulation surrounding the second metallic electrode lead, an electrolyte contacting the second electrochemically active region, and an outer sheath of a membrane permeable to the second specific ions encapsulating the second electrochemically active region and the electrolyte and forming a tight joint with the electrical insulations thereby forming a second specific ion electrode.

6. A miniature probe as in claim 5, in which one outer sheath is a potassium ion permeable membrane and the other outer sheath is a hydrogen ion permeable membrane.

7. A miniature probe as in claim 5, in which both of the electrolytes are immobilized aqueous solutions.

8. A miniature probe as in claim 5, in which both electrolytes are cation exchange resin materials.

9. A miniature probe containing a first specific ion electrode and a second specific electrode which comprises a flexible, elongated electrode lead, the electrode lead comprising an electronically conductive base member, an electrochemically active region showing response to the first specific ion adhering tightly to and in electrical contact with one end portion of the metallic base member, electrical insulation surrounding the metallic base member, and an outer sheath of a membrane permeable to the first specific ions encapsulating the electrochemically active region and forming a tight joint with the electrical insulation thereby forming a first specific ion electrode; a second metallic electrode lead surrounding at least partially and spaced from the base member of the first electrode lead by the electrical insulation thereon, a second electrochemically active region showing response to the second specific ions on the second electrode lead at one end thereof, electrical insulation surrounding the second metallic electrode lead, an electrolyte contacting the second electrochemically active region, and an outer sheath of a membrane permeable to the second specific ions encapsulating the second electrochemically active region and the electrolyte and forming a tight joint with the electrical insulations thereby forming a second specific ion electrode.

10. A miniature probe as in claim 9, in which one outer sheath is a potassium ion permeable membrane and the other outer sheath is a hydrogen ion permeable membrane.

11. A miniature probe as in claim 9, in which the electrolyte is an immobilized aqueous solution.

12. A miniature probe as in claim 9, in which the electrolyte is a cation exchange resin material.

* * * * *